US012425665B2

(12) United States Patent
Gupta et al.

(10) Patent No.: US 12,425,665 B2
(45) Date of Patent: Sep. 23, 2025

(54) SYSTEMS AND METHODS FOR PROVIDING CONTENT BASED ON MULTIPLE ANGLES

(71) Applicant: Adeia Guides Inc., San Jose, CA (US)

(72) Inventors: Vikram Makam Gupta, Karnataka (IN); Vishwas Sharadanagar Panchaksharaiah, Tumkur District (IN)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 16/580,400

(22) Filed: Sep. 24, 2019

(65) Prior Publication Data

US 2021/0092463 A1  Mar. 25, 2021

(51) Int. Cl.
| | |
|---|---|
| H04N 21/218 | (2011.01) |
| A63F 13/50 | (2014.01) |
| H04N 7/18 | (2006.01) |
| H04N 21/2187 | (2011.01) |
| H04N 21/234 | (2011.01) |
| H04N 21/24 | (2011.01) |
| H04N 21/258 | (2011.01) |
| H04N 21/81 | (2011.01) |
| H04N 23/90 | (2023.01) |

(52) U.S. Cl.
CPC ....... *H04N 21/21805* (2013.01); *A63F 13/50* (2014.09); *H04N 7/181* (2013.01); *H04N 21/2187* (2013.01); *H04N 21/234* (2013.01); *H04N 21/2402* (2013.01); *H04N 21/25816* (2013.01); *H04N 21/816* (2013.01); *H04N 23/90* (2023.01)

(58) Field of Classification Search
CPC ......... H04N 21/21805; H04N 21/2187; H04N 21/234; H04N 21/2402
USPC .......................................................... 725/116
See application file for complete search history.

(56) References Cited

U.S. PATENT DOCUMENTS

| | | | |
|---|---|---|---|
| 6,934,002 B1 | 8/2005 | Setteducati | |
| 7,761,892 B2 | 7/2010 | Ellis | |
| 8,046,801 B2 | 10/2011 | Ellis | |
| 10,187,666 B2 * | 1/2019 | Chang | ................ H04N 21/2187 |
| 2003/0023742 A1 | 1/2003 | Allen et al. | |
| 2003/0023974 A1 | 1/2003 | Dagtas et al. | |

(Continued)

OTHER PUBLICATIONS

Lange, et al., "Towards an optimized multiview streaming system with view interpolation," IEEE pp. 61063 (2017).

(Continued)

*Primary Examiner* — Joshua D Taylor
(74) *Attorney, Agent, or Firm* — Haley Guiliano LLP

(57) ABSTRACT

Systems and methods are described herein for identifying camera angles, based on network parameters, for content available at multiple camera angles. The system determines a network parameter of a network used to provide content that is recorded or rendered at various camera angles. The determined network parameters are used to identify camera angles that are supported by the network. For example, the video data associated with a camera angle having a prerequisite bit rate of 5 Megabits per second is supported by a network having a bandwidth parameter of 40 Mbps, while another camera angle having a prerequisite bit rate of 45 Megabits per second is not supported by the bandwidth parameter of 40 Mbps. The system provides the video data for identified camera angles supported by the network to a device for display.

20 Claims, 7 Drawing Sheets

(56) References Cited

U.S. PATENT DOCUMENTS

| | | |
|---|---|---|
| 2005/0261827 A1 | 11/2005 | Furukawa |
| 2007/0240183 A1 | 10/2007 | Garbow et al. |
| 2008/0148317 A1 | 6/2008 | Opaluch |
| 2008/0307453 A1* | 12/2008 | Haberman ......... H04N 21/2547 725/32 |
| 2009/0089294 A1 | 4/2009 | Davis et al. |
| 2009/0089352 A1 | 4/2009 | Davis et al. |
| 2009/0116379 A1* | 5/2009 | Rahman ........... H04N 21/26216 725/87 |
| 2010/0130176 A1* | 5/2010 | Wan .................. H04M 1/72522 455/414.1 |
| 2010/0229210 A1 | 9/2010 | Sharp et al. |
| 2013/0202265 A1 | 8/2013 | Arrasvuori et al. |
| 2014/0130079 A1 | 5/2014 | Arora et al. |
| 2016/0012855 A1 | 1/2016 | Krishnan |
| 2016/0286244 A1 | 9/2016 | Chang et al. |
| 2017/0103283 A1 | 4/2017 | Bostick et al. |
| 2018/0249189 A1 | 8/2018 | Cole et al. |
| 2018/0343168 A1* | 11/2018 | Hayashi .............. H04L 47/2483 |
| 2018/0343442 A1* | 11/2018 | Yoshikawa ...... G08B 13/19641 |
| 2019/0149731 A1* | 5/2019 | Blazer ................. G06F 3/04883 348/39 |
| 2019/0174149 A1* | 6/2019 | Zhang ................ H04N 21/2187 |
| 2019/0261007 A1* | 8/2019 | Emmanuel ............ H04W 24/02 |
| 2020/0334833 A1* | 10/2020 | Gibbon ............ H04N 21/23418 |

OTHER PUBLICATIONS

Su, et al., "A DASH-based HEVC multi-view video streaming system," Journal of Real-Time Image Processing, 12(2):329-342 (2015).

PCT Invitation to Pay Additional Fees for International Application PCT/US2020/052289, dated Mar. 31, 2021 (11 pages).

U.S. Appl. No. 16/580,407, filed Sep. 24, 2019, Vikram Makam Gupta.

* cited by examiner

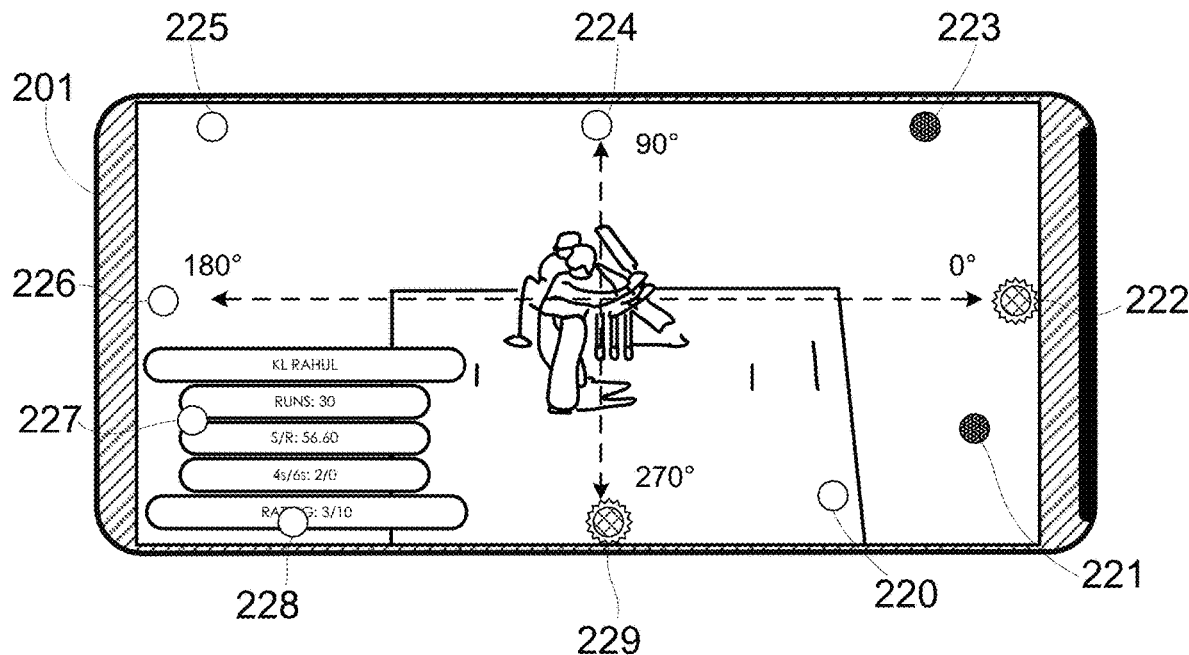

FIG. 2

```
{"type": "hlsStreamRequestResponse", "hlsSessionId": "tivo:hls.987654321",
"playlist": [
    {"playlistUrl": "/ss/987654321.m3u8", "type": "primaryUrl"},
    {"playlistUrl": "/ss/987654322.m3u8", "type": "camera1", "angle":300},
    {"playlistUrl": "/ss/987654322.m3u8", "type": "camera1", "angle":340},
    {"playlistUrl": "/ss/987654322.m3u8", "type": "camera1", "angle":0},
    {"playlistUrl": "/ss/987654322.m3u8", "type": "camera1", "angle":55},
    {"playlistUrl": "/ss/987654322.m3u8", "type": "camera1", "angle":90},
    {"playlistUrl": "/ss/987654322.m3u8", "type": "camera1", "angle":145},
    {"playlistUrl": "/ss/987654322.m3u8", "type": "camera1", "angle":182},
    {"playlistUrl": "/ss/987654322.m3u8", "type": "camera1", "angle":205},
    {"playlistUrl": "/ss/987654322.m3u8", "type": "camera1", "angle":230},
    {"playlistUrl": "/ss/987654322.m3u8", "type": "camera1", "angle":270},
], "sessionType": "streaming"}
```

702 — Determine a network parameter for a network

704 — Determine whether the network parameter supports video data for one or more camera angles 706 — Cause to be provided to a device the video data for the one or more of the camera angles

802 — Make video data for camera angles available to a device

804 — Determine whether one or more of the camera angles is likely to be of interest 806 — Cause to be provided to a device the video data for the one or more of the camera angles

FIG. 8

SYSTEMS AND METHODS FOR PROVIDING CONTENT BASED ON MULTIPLE ANGLES

BACKGROUND OF THE INVENTION

The present disclosure is directed to digital content delivery, and more particularly, to providing content based on camera angles at which video data of the content was captured.

SUMMARY

Video content is often captured at various angles. For example, a football match is filmed with multiple cameras, each positioned at a different angle to capture the match. Digitally generated content such as video games is also rendered at various angles. For example, a video game allows a user to select which angle he wants to play using his avatar (e.g., looking behind or in front of his avatar). As communication systems support increasing network bandwidths, these angles may be provided to a device (e.g., a smartphone) through a streaming service offered by content providers such as ESPN and Steam. However, parameters of a network such as network bandwidth or download speed affect the amount of video data capable of being provided to a device on the network. Having multiple angles of content may overwhelm a consumer who is unable to determine the angle that is likely to be of interest. In order to address these issues, a content application is provided that identifies one or more of the multiple camera angles available based on network parameters, likelihood of interest, or a combination thereof.

Systems and methods are described herein for providing content based on camera angles at which video data of the content was captured. As used herein, a "camera angle" refers to a vantage point at which a content item is recorded or rendered for consumption. A physical camera may generate one or more camera angles or a graphics production program may render one or more camera angles of digitally animated content.

In some embodiments, a content application causes video data for one or more camera angles of multiple camera angles to be provided to a device based on a network parameter. The content application determines a network parameter for a network over which a content item, including video data for multiple camera angles, is provided to the device. The content application identifies one or more of the camera angles for which to provide video data using the network based at least in part on the network parameter. The content application then causes the video data to be provided to the device for the identified one or more camera angles.

The content application may determine the network parameter by determining at least one of a network bandwidth, a number of users on the network, a maximum download speed, any suitable performance metric of a network, any suitable usage metric of a network, or any combination thereof. The camera angles for which video data is provided may be identified based on a predefined distribution of camera angles spanning 360 degrees. For example, camera angles may be provided such that the distribution of camera angles evenly covers angle values spanning 360 degrees (e.g., a three-angle distribution is predefined to be angles closest to 0 degrees, 120 degrees, and 270 degrees). In some embodiments, the content application identifies which camera angles for which to provide video data based on a user indication of a camera angle. For example, the user indication of a camera angle may include a change in the orientation of the device (e.g., a user tilts the device by 25 degrees). In some embodiments, the content application provides a notification, to the device, indicating that the network will not adequately support the video data corresponding to the camera angle associated with the user indication. For example, a user tilts the device 25 degrees to select an angle at 180 degrees, and the system provides a notification that the download speed is not sufficient for the video data associated with the camera angle of 180 degrees to be provided. In some embodiments, the content application causes video data for the camera angles to be provided, to the device, by communicating video data addresses (e.g., URLs) corresponding to the camera angles.

In some embodiments, a content application causes video data for one or more camera angles of multiple camera angles to be provided to a device based on an identification of camera angles likely to be of interest. The content application may make the video data for the camera angles available to the device. In some embodiments, the content application dynamically identifies camera angles that are likely to be of interest. In some embodiments, camera angles are pre-curated such that the camera angles that are likely to be of interest are determined before the video data for the camera angles is made available to the device. The content application may cause the video data for the camera angles identified to be likely of interest to be provided to the device.

In some embodiments, the content application dynamically identifies the camera angles by identifying that one or more camera angles are likely to be of interest relative to other camera angles of the multiple camera angles. The content application may, to identify camera angles likely to be of interest relative to other camera angles, determine that an enlarged depiction of an object is presented in a camera angle. For example, an enlarged depiction of a court boundary is presented on a camera angle that clearly shows that an athlete has stepped out of bounds. The content application may identify camera angles likely to be of interest relative to other camera angles by determining that a view of an event being depicted is unobstructed. For example, the content application identifies a camera angle that follows the trajectory of a soccer ball across a field without any player blocking the view of the soccer ball. The content application may, to identify camera angles likely to be of interest relative to other camera angles, determine a ranking of the multiple camera angles. For example, the content application ranks camera angles in an order of most to least likely to be of interest. The content application may cause visual indicators indicative of the determined ranking to be displayed at the device. For example, the content application may display buttons for each provided camera angle, and a top percentile of the ranked camera angles may have a unique color as a visual indicator of the high ranking. The identification of a camera angle as likely to be of interest may be further based on historical data, empirical data, real-time statistics, or a combination thereof. In some embodiments, the content application dynamically identifies the camera angles by determining camera angles that are likely to be of interest based on historical data. For example, historical data of camera angles for basketball games shows that the camera angle of 90 degrees is most popular among users after a dunk is made (e.g., the angle depicting the reaction of players on the bench). Real-time statistics suggest, in some embodiments, that a camera angle is likely to be of interest (e.g., the largest percentage of users are consuming a camera angle in real-time). In some embodiments, the video data corresponds to a real-time broadcast (e.g., a live stream of an event), prerecorded content item (e.g., a highlight reel), or a combination thereof (e.g., the live stream of an event augmented with a highlight reel of related events). The content application may make the video data for the camera angles available to the device by providing, to the device, video data addresses (e.g., URLs) hosting the video data corresponding to the camera angles.

It should be noted that the systems, methods, apparatuses, and/or aspects described above may be applied to, or used in accordance with other systems, methods, apparatuses, and/or aspects described in this disclosure.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts through and in which:

FIG. 2 shows an illustrative embodiment of an interface for consuming content captured at multiple camera angles, in accordance with at least some embodiments of the disclosure;

FIG. 3 shows an illustrative data structure for providing content captured at multiple camera angles, in accordance with at least some embodiments of the disclosure;

FIG. 7 depicts a flowchart of an illustrative process for determining one or more camera angles to provide based on a network parameter, in accordance with at least some embodiments of the disclosure;

FIG. 8 depicts a flowchart of an illustrative process for identifying a camera angle that is likely to be of interest, in accordance with at least some embodiments of the disclosure.

DETAILED DESCRIPTION OF THE DRAWINGS

Figure 1A:
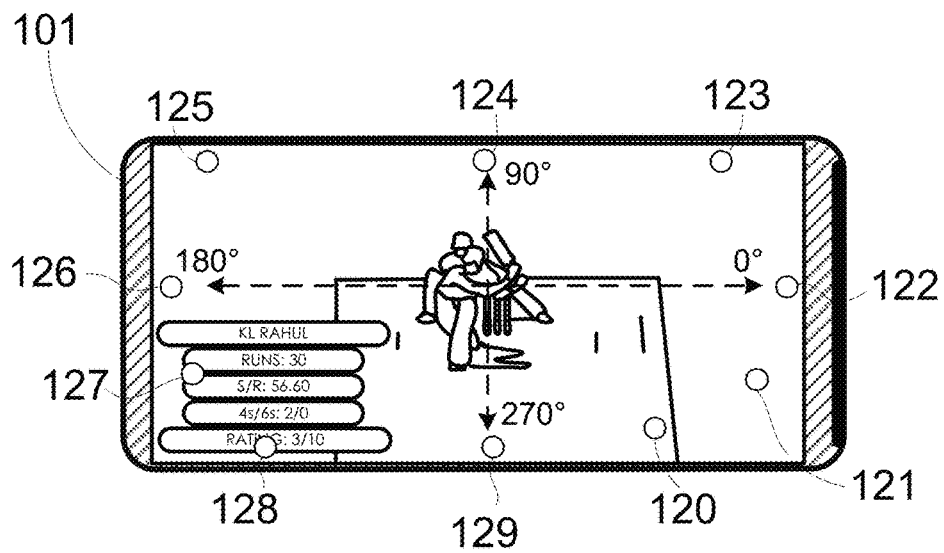
FIGS. 1A-1C show an illustrative embodiment of a process for consuming content captured at multiple camera angles, in accordance with at least some embodiments of the disclosure.
Figure 1B:
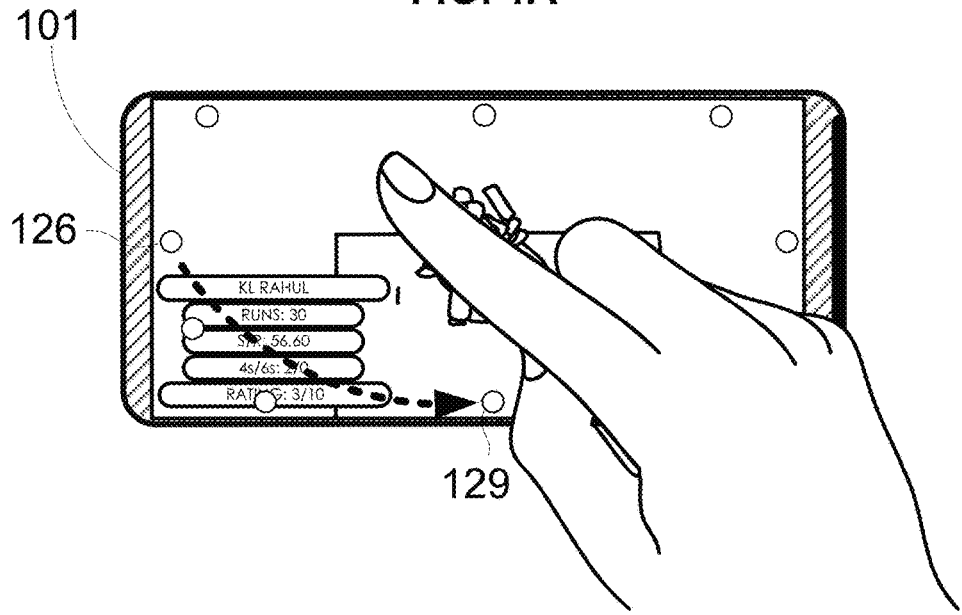
Figure 1C:
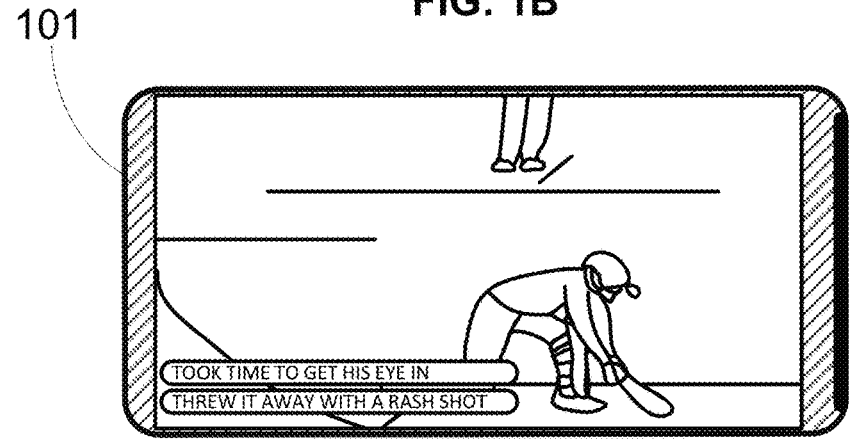

FIGS. 1A-1C show an illustrative embodiment of a process for consuming content captured at multiple camera angles, in accordance with at least some embodiments of the disclosure. Device 101 is an electronic device capable of displaying video data of content that is captured at multiple camera angles. As depicted through FIGS. 1A-1C, a cricket match captured at camera angles 120-129 is displayed on device 101. FIG. 1A shows an embodiment of a content application providing a content item to device 101 for consuming a cricket match at camera angles 120-129. FIG. 1B shows an embodiment of an action that may result in a change in the camera angle that is provided for display at device 101. For example, device 101 may receive user indications (e.g., a swipe across a screen of a device) that the user is interested in viewing camera angle 129. FIG. 1C shows a change in video data provided in response to the user indication.

As referred to herein, the terms "content item" and "media asset" should be understood to mean an electronically consumable user asset, such as television programming, as well as pay-per-view programs, on-demand programs, Internet content (e.g., streaming content, downloadable content, or Webcasts), video, audio, playlists, electronic books, social media, applications, games, any other media, or any combination thereof. Media content items may be recorded, played, displayed or accessed by devices. As referred to herein, "content providers" are digital repositories, conduits, or both of media content items. Content providers may include cable sources, over-the-top content providers, or other sources of content.

As referred to herein, a "device" should be understood to mean an electronic device capable of providing media content for consumption directly to a user. Devices include smartphones, tablets, virtual reality headsets, televisions, any other electronic device for content consumption, or any suitable combination thereof. As referred to herein, a "content application" includes any suitable software, hardware, or both for implementing the features described herein. The content application may be implemented either entirely or partially on a device such as device 101. When implemented partially on device 101, the content application may be further partially implemented using any other suitable equipment located either locally to device 101 or remotely from device 101. The content application, in some embodiments, functions as a platform for content delivery on a device. In such embodiments, the content application is in either direct or indirect communication with one or more content providers using any suitable communication channels.

Although depicted in the user interface for added clarity, the axes corresponding to the angles within 360 degrees and the angle labels of 0 degrees, 90 degrees, 180 degrees, and 270 degrees are not necessarily provided for display by the content application. Camera angles 120-129 are associated with digital buttons displayed in the interface on device 101. Although not depicted, there may be additional camera angles available for display at device 101. For example, a total of 50 camera angles are available to be provided to device 101. The content application may determine a subset of the available angles to provide to device 101.

In some embodiments, camera angles 120-129 are determined by the content application based on network parameters. Network parameters include network bandwidth, number of users on the network, a maximum download speed, any suitable performance metric of a network, any suitable usage metric of a network, or any combination thereof. For example, the content application determines the network bandwidth (e.g., a maximum capacity for uploading and downloading data determined by an Internet service provider or communications equipment) and provides camera angles 120-129, whose total bandwidth requirements are satisfied by the network bandwidth. The content application may determine the number of users on a network and, based on the number of users, determine which camera angles to provide. For example, if there are no other users or devices on the network, the content application determines that the full network bandwidth is dedicated to the device and identifies camera angles based on the full network bandwidth. If there are N users on the network, the content application may divide the network bandwidth by N and determine which camera angles to provide based on the resulting portion of the network bandwidth. In some embodiments, the content application may determine a maximum download speed. For example, the content application determines a maximum download speed of 90 megabits per second (Mbps) and identifies camera angles such that the download speed required to stream the video data associated with the identified camera angles is not greater than 90 Mbps.

The identification of camera angles to provide may be further based on a predefined distribution of camera angles within 360 degrees. The predefined distribution may be such that the camera angles are distributed evenly within 360 degrees. For example, the content application identifies, based on a total download speed of 90 Mbps, a first set of three camera angles located at approximately 120 degrees, 240 degrees, and 360 degrees, each requiring 30 Mbps to download and a second set of two camera angles located at approximately 45 degrees and 90 degrees, each requiring 45 Mbps to download. Although both sets of camera angles are supported by the network parameter, the first set may be preferred over the second because the camera angles are approximately evenly distributed within 360 degrees. In some embodiments, a predefined distribution may be determined based on the event depicted in the content item. For example, a cricket field has positions in a circular distribution such that many angles within 360 degrees capture content of interest, while a video game may have content of interest primarily in front of an active avatar (e.g., a range of approximately 200 degrees of the 360 degrees available). For camera angles associated with the video game, the predefined distribution may be within a range of 200 degrees rather than the full 360 degrees range.

A user indication may be used in the content application's identification of camera angles to provide video data for. A user indication includes a swipe on the surface of a device, a change in orientation of a device (e.g., a tilt), any suitable input for requesting a change in camera angle, or any combination thereof. An orientation of a device may be measured by microelectromechanical system (MEMS) sensors such as gyroscopes and accelerometers to determine a change in orientation associated with a request for a specific camera angle. For example, the device may be at a first position and rotated clockwise by 30 degrees to indicate that a user is selecting a camera angle that is approximately 30 degrees clockwise of the currently presented camera angle. The content application may cause the video data associated with the closest available angle (e.g., an angle supported by the network parameter) to be provided at the device. For example, the angle that is clockwise by 30 degrees of the currently presented camera angle (e.g., currently at 90 degrees) is 60 degrees, and the closest available camera angle to 60 degrees is at 50 degrees.

The content application may provide a notification to the device indicating that the network will not adequately support the video data corresponding to the camera angle of the plurality of camera angles. A camera angle may not be adequately supported because of incompatibilities related to formatting (e.g., 4K v. HD), content sources (e.g., camera angles provided from different content sources, where one uses an unsupported network protocol), permissions issues (e.g., a paywall), security issues (e.g., a firewall), or any combination thereof. Using the previous example with a 30 degrees clockwise rotation, a camera angle at 60 degrees may require a 100 Mbps download speed while the network can support a maximum download speed of only 90 Mbps. In some embodiments, the content application provides a notification that the video data at a camera angle of 60 degrees is not adequately supported by the download speed network parameter.

The content application may communicate video data addresses corresponding to the camera angles. For example, as shown in FIG. 3, URLs 320-329 are associated with respective camera angles 120-129. In some embodiments, the content application provides authorization to device 101 to access one or more of the URLs associated with camera angles 120-129. For example, if 50 total camera angles are available for the cricket match displayed in FIGS. 1A-1C, the content application grants access to the device for only camera angles 120-129.

In some embodiments, camera angles 120-129 are determined by the content application based on a likelihood of interest. A likelihood of interest in a camera angle may be determined relative to likelihoods of interest in other camera angles. For example, a content application may determine that, of 50 total camera angles available, camera angles 120-129 were more likely to be of interest as compared to the other 40 camera angles. A comparison may be based on what is depicted in camera angles 120-129 as compared with what is depicted in the other 40 camera angles. For example, camera angles 120-129 depict cricket players at all times because they capture players stationed at designated cricket field positions (e.g., long stop), while the other 40 camera angles capture the grass between players or the audience in the bleachers.

The content application may identify which camera angles are likely to be of interest relative to other camera angles by determining that an enlarged depiction of an object is presented in certain camera angles. For example, certain camera angles capture a larger depiction of a boundary or edge of a playing field than is captured by other angles. In some embodiments, the content application identifies camera angles that are likely to be of interest relative to other camera angles by determining that a view of an event being depicted is unobstructed. For example, certain camera angles present unobstructed views of the cricket bat while others have players blocking the view of the cricket bat. The content application may perform image processing on the video data to determine the relative sizes of an object depicted in multiple camera angles. The content application may perform image processing on the video data and determine representation of the entire event captured by the camera angles to identify obstructions in the way of an object of interest. For example, the content application uses image processing to identify players and equipment such as the cricket ball. Based on the identified objects and angles at which they are taken, the content application may determine what objects could possibly be depicted at each angle and determine objects are obstructed at an angle if they are not depicted at the respective angle.

In some embodiments, the content application identifies camera angles that are likely to be of interest relative to other camera angles by determining a ranking of the camera angles. The ranking may be based on historical data or a comparison of what is depicted in each camera angle. For example, the content application ranks camera angles according to a usage metric (e.g., how many users have accessed or are currently accessing the camera angle). The camera angles are ranked, in some embodiments, based on image processing of what is depicted within each camera angle. For example, the content application ranks camera angles according to the degrees to which an enlarged depiction of an object is available (e.g., ranked from most enlarged depiction to least).

The content application may cause visual indicators to be provided for display at a device. The visual indicators are indicative of a determined ranking of the camera angles. As shown in FIG. 2, visual indicators are associated with the video data provided for camera angles 222, 229, 221, and 223. Visual indicators may reflect a higher-ranked camera angle (e.g., camera angles 222 and 229) or a lower-ranked camera angle (e.g., camera angles 221 and 223).

A likelihood of interest in a camera angle may be determined based on historical data. Historical data includes usage metrics for the camera angles of a content item. For example, a histogram of the number of users viewing camera angles over time may be used to determine the camera angle most likely to be of interest at different times in the content item. The content application may also use the number of users who have requested or are requesting a camera angle to determine that the camera angle is likely to be of interest.

The video data associated with the camera angles is, in some embodiments, of a real-time broadcast. For example, a cricket game that is broadcast at multiple angles live is made available to a device by the content application. In some embodiments, the video data associated with the camera angles is of a prerecorded content item. For example, the sports event that was broadcast live is recorded such that the video data for the multiple camera angles is available for consumption at the device. A movie or TV program that is recorded with multiple cameras is, in some embodiments, a prerecorded content item with which the content item applies the dynamic identification of camera angles as described herein.

FIG. 2 shows an illustrative embodiment of an interface for consuming content captured at multiple camera angles, in accordance with at least some embodiments of the disclosure. A content item (e.g., a cricket match) is presented on device 201 based on multiple camera angles capturing the match. The cricket match presented may be a real-time broadcast of a match, a playback of a prerecorded match, or a combination thereof. For example, a real-time broadcast of a cricket match may be augmented with prerecorded highlights of a related match (e.g., a previous match between the two teams). As shown in FIG. 2, a content application may cause the video data for one or more camera angles (e.g., camera angles 220-229) to be provided to device 201 with visual indicators displayed indicative of a ranking of the camera angles.

In some embodiments, the content application determines that a predetermined amount of the provided camera angles should be visually distinguished for display at a device. For example, the content application determines that the top 20% of ranked camera angles are to be associated with a visual indicator showing that their rank is superior to the ranking of other camera angles. As depicted in FIG. 2, camera angles 222 and 229 are associated with visual indicators that indicate that camera angles 222 and 229 are superior to camera angles 220, 221, and 223-228. The content application may change the color, brighten, or apply any suitable graphic effect for visually distinguishing a digital button, or apply any combination thereof to a digital button associated with a camera angle. In some embodiments, the content application provides visual indicators that distinguish inferior camera angles. For example, the content application determines that the bottom 20% of ranked camera angles are associated with a visual indicator showing that their rank is inferior to the ranking of other camera angles. As depicted in FIG. 2, camera angles 221 and 223 are associated with visual indicators that indicate that camera angles 221 and 223 are inferior to camera angles 220, 222, and 224-229. The content application may provide visual indicators for display that darken associated camera angles 221 and 223.

FIG. 3 shows an illustrative data structure for providing content captured at multiple camera angles, in accordance with at least some embodiments of the disclosure. In some embodiments, a content item having video data associated with multiple camera angles is made available to a device through respective video data addresses (e.g., URLs). Video data addresses 320-329 may correspond to camera angles 220-229, respectively. In some embodiments, video data addresses 320-329 are provided based on a network parameter. The content application may determine a network parameter of the network over which the content item is being provided to a device. For example, the network bandwidth allows for video data from video data addresses 320-329 to be transmitted because the bandwidth required for video data of camera angles 220-229 does not exceed the network bandwidth. In some embodiments, the content application provides authorization to the device to access video data addresses 220-229. For example, an additional security protocol is implemented such that the device having the video address to access is unable to download the data at the address due to lack of permissions set by the content application.

Figure 4:
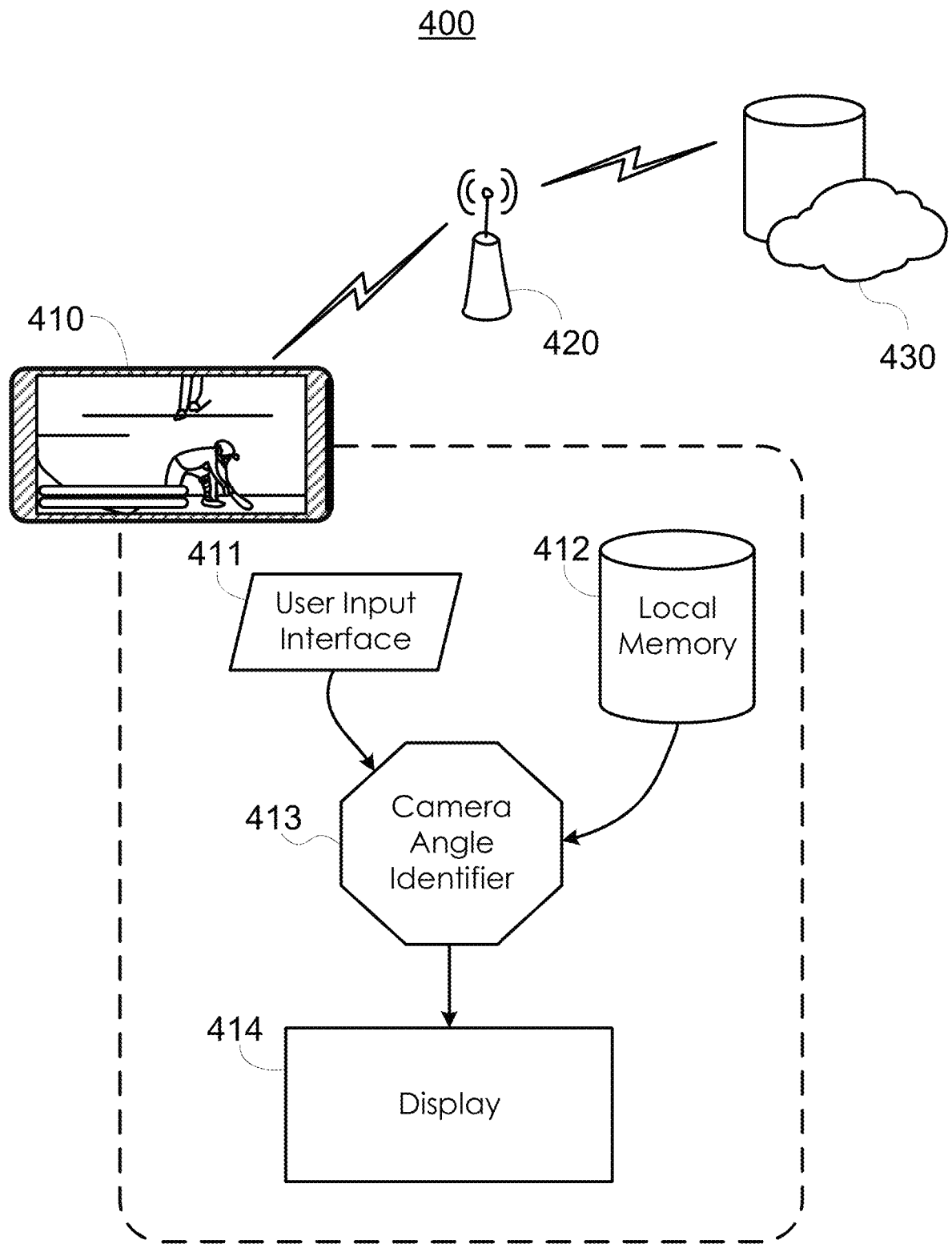
FIG. 4 shows a diagram of an illustrative system for providing content based on multiple camera angles, in accordance with at least some embodiments of the disclosure.

FIG. 4 shows a diagram of an illustrative system for providing content based on multiple camera angles, in accordance with at least some embodiments of the disclosure. Device 410 and content source 430 are communicatively linked through network communication node 420. For example, a mobile phone may be linked to the content source of a streaming service such as Steam over a communication network (e.g., communication network 420) enabled by a Wi-Fi router. Device 410 includes local memory 412, display 414, and control circuitry (e.g., control circuitry 504 of FIG. 5). The control circuitry further includes camera angle identifier 413 for determining video data to provide to display 414. The determination may be based on user input from user input interface 411 (e.g., a tilt of a smartphone indicating a desired camera angle). Although depicted as separate from user input interface 411, display 414 may a component of user input interface 411. For example, a touchscreen of a smartphone is capable of receiving user input through swipes on the touchscreen and displaying content items. Although depicted as a component of device 410, camera angle identifier 413 for identifying video data for camera angles of the content item to be provided at display 414 may be located in a remote server (e.g., at content source 430).

The control circuitry or camera angle identifier 413 associated with control circuitry may perform any one portion of the entirety of the camera angle identification process described herein. For example, camera angle identifier 413 may determine a network parameter for the network of the communication link between network communication node 420 and device 410 or for the network of the communication link between content source 430 and device 410. Based on the determined network parameter, camera angle identifier 413 may identify camera angles to request to be provided over the network. The provided camera angles are, in some embodiments, stored in local memory 412 such that camera angle identifier 413 provides them to display 414 with minimal delay. In some embodiments, camera angle identifier 413 dynamically identifies one or more of the available camera angles as likely to be of interest. Camera angle identifier 413 uses, in some implementations, historical data to dynamically identify the one or more camera angles. For example, camera angle identifier 413 determines that a number of users (e.g., a user number exceeding a threshold) accessed a camera angle indicative that the camera angle is likely to be of interest. Historical data may include current usage data. For example, camera angle identifier 413 determines the number of devices to which content source 430 is currently providing video data for a camera angle. If the number of devices is above a threshold number representative of a sufficient likelihood of interest, camera angle identifier 413 identifies the camera angle as likely to be of interest.

Figure 5:
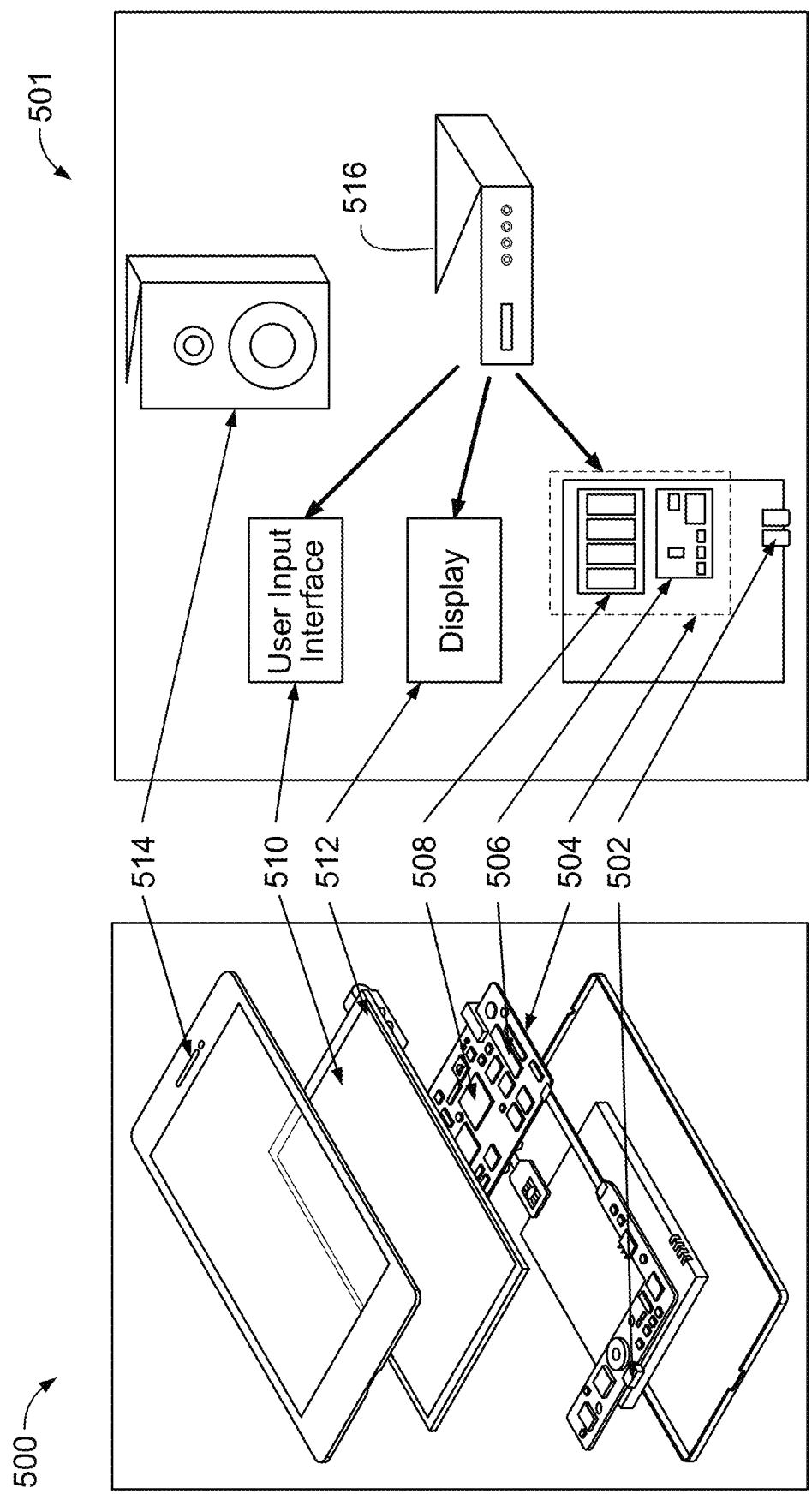
FIG. 5 shows a block diagram of an illustrative device, in accordance with at least some embodiments of the disclosure.

Users may access content from one or more of their devices. FIG. 5 shows generalized embodiments of a device capable of presenting content on a display 512. For example, display 512 may belong to a smartphone device. In another example, display 512 may belong to a user television equipment system. User television equipment system with display 512 may include a set-top box 516. Set-top box 516 may be communicatively connected to speaker 514 and display 512. In some embodiments, display 512 may be a television display or a computer display. In some embodiments, set top box 516 may be communicatively connected to user interface input 510. In some embodiments, user interface input 510 may be a remote-control device. Set-top box 516 may include one or more circuit boards. In some embodiments, the circuit boards may include processing circuitry, control circuitry, and storage (e.g., RAM, ROM, Hard Disk, or Removable Disk). In some embodiments, circuit boards may include an input/output path. More specific implementations of devices are discussed below in connection with FIG. 6. Each one of device 500 and user equipment system 501 may receive content and data via input/output (hereinafter "I/O") path 502. I/O path 502 may provide content (e.g., broadcast programming, on-demand programming, Internet content, content available over a local area network (LAN) or wide area network (WAN), and/or other content) and data to control circuitry 504, which includes processing circuitry 506 and storage 508. Control circuitry 504 may be used to send and receive commands, requests, and other suitable data using I/O path 502. I/O path 502 may connect control circuitry 504 (and specifically processing circuitry 506) to one or more communications paths (described below). I/O functions may be provided by one or more of these communications paths but are shown as a single path in FIG. 5 to avoid overcomplicating the drawing.

Control circuitry 504 may be based on any suitable processing circuitry such as processing circuitry 506. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 504 executes instructions for an application stored in memory (e.g., storage 508). Specifically, control circuitry 504 may be instructed by the application to perform the functions discussed above and below. For example, the application may provide instructions to control circuitry 504 to identify camera angles for which video data is to be provided to a user device based on the network or a likelihood of interest. In some implementations, any action performed by control circuitry 504 may be based on instructions received from the application.

In client-server based embodiments, control circuitry 504 may include communications circuitry suitable for communicating with a content application server or other networks or servers. The instructions for carrying out the above-mentioned functionality may be stored on the content application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 6). In addition, communications circuitry may include circuitry that enables peer-to-peer communication of devices, or communication of devices in locations remote from each other (described in more detail below).

Memory may be an electronic storage device provided as storage 508 that is part of control circuitry 504. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 508 may be used to store various types of content described herein, including, for example, the video data corresponding to the multiple angles of a content item that is streamed to a device and historical data for determining which camera angle is likely to be of interest. Nonvolatile memory may also be used (e.g., to launch a boot-up routine and other instructions). Cloud-based storage, described in relation to FIG. 6, may be used to supplement storage 508 or instead of storage 508. In some embodiments, a database is accessible at the cloud-based storage, where the database stores a content item that is streamed to a device, sets of video frames that are identified as suitable replacements for corresponding video frames, metadata containing mappings of time segments to sets of video frames, and identifiers for scene start and end points. Nonvolatile memory may also be used (e.g., to launch a boot-up routine and other instructions).

Control circuitry 504 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 504 may also include scaler circuitry for upconverting and downconverting content into the preferred output format of the user equipment 500. Circuitry 504 may also include digital-to-analog converter circuitry and analog-to-digital converter circuitry for converting between digital and analog signals. The tuning and encoding circuitry may be used by the device to receive and to display, to play, or to record content. The tuning and encoding circuitry may also be used to receive content data.

The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, or multiple-tuner recording). If storage 508 is provided as a separate device from user equipment 500, the tuning and encoding circuitry (including multiple tuners) may be associated with storage 508.

A user may send instructions to control circuitry 504 using user input interface 510. User input interface 510 may be any suitable user interface, such as a remote control, mouse, trackball, keypad, keyboard, touchscreen, touchpad, stylus input, joystick, voice recognition interface, or other user input interfaces. Display 512 may be provided as a stand-alone device or integrated with other elements of each one of device 500 and user equipment system 501. For example, display 512 may be a touchscreen or touch-sensitive display. In such circumstances, user input interface 510 may be integrated with or combined with display 512. Display 512 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 512 may be HDTV-capable. In some embodiments, display 512 may be a 3D display, and the interactive application and any suitable content may be displayed in 3D. A video card or graphics card may generate the output to the display 512. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 504. The video card may be integrated with the control circuitry 504. Speakers 514 may be provided as integrated with other elements of each one of device 500 and user equipment system 501 or may be stand-alone units. The audio component of videos and other content displayed on display 512 may be played through speakers 514. In some embodiments, the audio may be distributed to a receiver (not shown), which processes and outputs the audio via speakers 514.

The content application may be implemented using any suitable architecture. For example, it may be a stand-alone application wholly-implemented on each one of device 500 and user equipment system 501. In such an approach, instructions of the application are stored locally (e.g., in storage 508), and data for use by the application is downloaded on a periodic basis (e.g., from an out-of-band feed, from an Internet resource, or using another suitable approach). Control circuitry 504 may retrieve instructions of the application from storage 508 and process the instructions to generate any of the displays discussed herein. Based on the processed instructions, control circuitry 504 may determine what action to perform when input is received from input interface 510.

In some embodiments, the application is a client-server based application. Data for use by a thick or thin client implemented on each one of device 500 and user equipment system 501 is retrieved on-demand by issuing requests to a server remote to each one of device 500 and user equipment system 501. In one example of a client-server based content application, control circuitry 504 runs a web browser that interprets web pages provided by a remote server. For example, the remote server may store the instructions for the application in a storage device. The remote server may process the stored instructions using circuitry (e.g., control circuitry 504) and generate the displays discussed above and below. The client device may receive the displays generated by the remote server and may display the content of the displays locally on equipment device 500. This way, the processing of the instructions is performed remotely by the server while the resulting displays are provided locally on equipment device 500.

In some embodiments, the content application is downloaded and interpreted or otherwise run by an interpreter or virtual machine (run by control circuitry 504). In some embodiments, the content application may be encoded in the ETV Binary Interchange Format (EBIF), received by control circuitry 504 as part of a suitable feed, and interpreted by a user agent running on control circuitry 504. For example, the content application may be an EBIF application. In some embodiments, the content application may be defined by a series of JAVA-based files that are received and run by a local virtual machine or other suitable middleware executed by control circuitry 504. In some of such embodiments (e.g., those employing MPEG-2 or other digital media encoding schemes), the content application may be, for example, encoded and transmitted in an MPEG-2 object carousel with the MPEG audio and video packets of a program.

Figure 6:
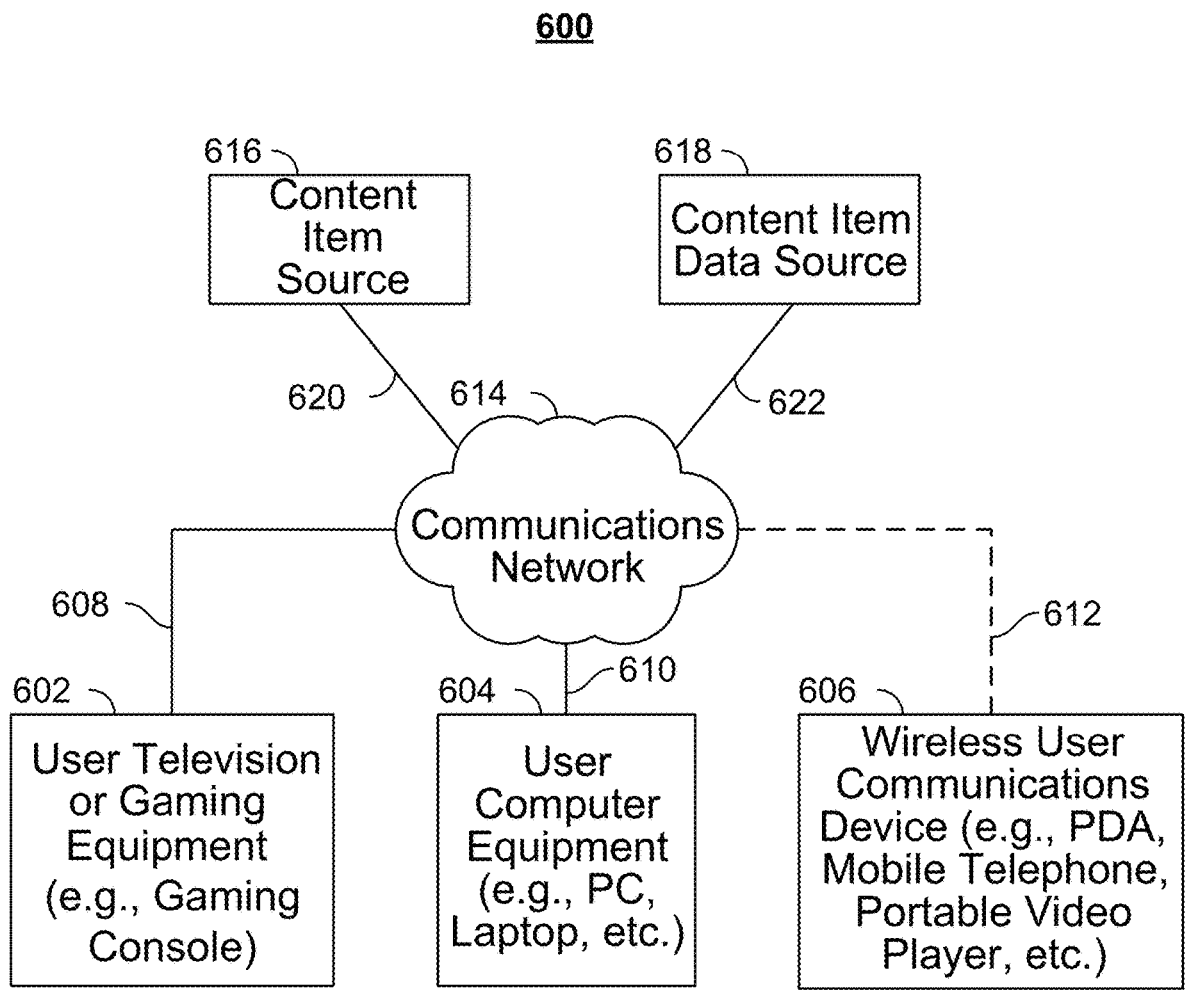
FIG. 6 shows a block diagram of an illustrative content output system, in accordance with at least some embodiments of the disclosure.

Each one of device 410 and user equipment system 501 of FIG. 5 may be implemented in system 600 of FIG. 6 as user television equipment 602, user computer equipment 604, wireless user communications device 606, or any other type of user equipment suitable for accessing content, such as a non-portable gaming machine. For simplicity, these devices may be referred to herein collectively as user equipment or devices and may be substantially similar to devices described above. Devices, on which an application may be implemented, may function as a standalone device or may be part of a network of devices. Various network configurations of devices may be implemented and are discussed in more detail below.

A device utilizing at least some of the system features described above in connection with FIG. 5 may not be classified solely as user television equipment 602, user computer equipment 604, or a wireless user communications device 606. For example, user television equipment 602 may, like some user computer equipment 604, be Internet-enabled allowing for access to Internet content, while user computer equipment 604 may, like some television equipment 602, include a tuner allowing for access to television programming. The application may have the same layout on various different types of user equipment or may be tailored to the display capabilities of the user equipment. For example, on user computer equipment 604, the content application may be provided as a web site accessed by a web browser. In another example, the content application may be scaled down for wireless user communications devices 606.

In system 600, there is typically more than one of each type of device but only one of each is shown in FIG. 6 to avoid overcomplicating the drawing. In addition, each user may utilize more than one type of device and also more than one of each type of device.

In some embodiments, a device (e.g., user television equipment 602, user computer equipment 604, wireless user communications device 606) may be referred to as a "second device." For example, a second device may provide an interface for adjusting settings and display preferences of the first device. In some embodiments, the second device is configured for interacting with other second devices or for interacting with a social network. The second screen device may be located in the same room as the first device, a different room from the first device but in the same house or building, or in a different building from the first device.

The user may also set various settings to maintain consistent application settings across in-home devices and remote devices. For example, if a user enables dynamic identification of camera angles to be provided for display on their personal computer at their office, this feature would also be enabled on the user's in-home devices (e.g., user television equipment and user computer equipment) as well as the user's mobile devices, if desired. Therefore, changes made on one device may change the content experienced on another device, regardless of whether they are the same or a different type of device. In addition, the changes made may be based on settings input by a user, as well as user activity monitored by the content application. In addition, two devices may work together to provide functionality for the user. For example, the first device identifying which camera angle for which to provide video data may further instruct the second device to display the video data of the identified camera angle.

The devices may be coupled to communications network 614. Namely, user television equipment 602, user computer equipment 604, and wireless user communications device 606 are coupled to communications network 614 via communications paths 608, 610, and 612, respectively. Communications network 614 may be one or more networks including the Internet, a mobile phone network, mobile voice or data network (e.g., a 4G or LTE network), cable network, public switched telephone network, or other types of communications network or combinations of communications networks. Paths 608, 610, and 612 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 612 is drawn with dotted lines to indicate that in the exemplary embodiment shown in FIG. 6 it is a wireless path and paths 608 and 610 are drawn as solid lines to indicate they are wired paths (although these paths may be wireless paths, if desired). Communications with the devices may be provided by one or more of these communications paths but are shown as a single path in FIG. 6 to avoid overcomplicating the drawing.

Although communications paths are not drawn between devices, these devices may communicate directly with each other via communications paths, such as those described above in connection with paths 608, 610, and 612, as well as other short-range point-to-point communications paths, such as USB cables, IEEE 1394 cables, wireless paths (e.g., Bluetooth, infrared, or IEEE 602-11x), or other short-range communication via wired or wireless paths. BLUETOOTH is a certification mark owned by Bluetooth SIG, INC. The devices may also communicate with each other directly through an indirect path via communications network 614.

System 600 includes content source 616 and content data source 618 coupled to communications network 614 via communications paths 620 and 622, respectively. Paths 620 and 622 may include any of the communications paths described above in connection with paths 608, 610, and 612. Communications with the content source 616 and content data source 618 may be exchanged over one or more communications paths but are shown as a single path in FIG. 6 to avoid overcomplicating the drawing. In addition, there may be more than one of each of content source 616 and content data source 618, but only one of each is shown in FIG. 6 to avoid overcomplicating the drawing. If desired, content source 616 and content data source 618 may be integrated as one source device. Although communications between sources 616 and 618 with devices 602, 604, and 606 are shown as through communications network 614, in some embodiments, sources 616 and 618 may communicate directly with devices 602, 604, and 606 via communications paths (not shown) such as those described above in connection with paths 608, 610, and 612.

Content source 616 may include one or more types of content distribution equipment including a television distribution facility, cable system headend, satellite distribution facility, programming sources (e.g., television broadcasters), intermediate distribution facilities and/or servers, Internet providers, on-demand content servers, and other content providers. Content source 616 may be the originator of content (e.g., a television broadcaster or a Webcast provider) or may not be the originator of content (e.g., an on-demand content provider or an Internet provider of content of broadcast programs for downloading). Content source 616 may include cable sources, satellite providers, on-demand providers, Internet providers, over-the-top content providers, or other providers of content. Content source 616 may also include a remote content server used to store different types of content (including video content selected by a user), in a location remote from any of the devices. Content source 616 may include at least 2 sources for content that provide content for the content application to provide on the user devices (e.g., user devices 102 and 202). Systems and methods for remote storage of content and providing remotely stored content to user equipment are discussed in greater detail in connection with Ellis et al., U.S. Pat. No. 7,761,892, issued Jul. 20, 2010, which is hereby incorporated by reference herein in its entirety.

Content data source 618 may provide data related to the content. Content data may be provided to the devices using any suitable approach. In some embodiments, the content application may be a stand-alone interactive television program guide that receives program guide data via a data feed (e.g., a continuous feed or trickle feed). Program schedule data and other content data may be provided to the user equipment on a television channel sideband, using an in-band digital signal, using an out-of-band digital signal, or by any other suitable data transmission technique. Program schedule data and other content data may be provided to user equipment on multiple analog or digital television channels.

In some embodiments, content data from content data source 618 may be provided to user's equipment using a client-server approach. For example, a user equipment device may pull content data from a server, or a server may push content data to a user equipment device. In some embodiments, a content application client residing on the user's equipment may initiate sessions with source 618 to obtain content data when needed, e.g., when the content data is out of date or when the device requests the data. Content data may be provided to the user equipment with any suitable frequency (e.g., continuously, daily, a user-specified period of time, a system-specified period of time, or in response to a request from user equipment). Content data source 618 may provide devices 602, 604, and 606 the application itself or software updates for the application.

In some embodiments, the content data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, or brain activity information). The content data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of less or more than one year. The content data may include a model (e.g., a survivor model) used for generating a score that indicates a likelihood a given user will terminate access to a service/source. For example, the application may monitor a user's engagement with content to generate a value or score that indicates a likelihood of whether the given user will terminate access to a particular service or source. In particular, a higher score may indicate a higher level of confidence that the user will terminate access to a particular service or source. Based on the score, the application may generate promotions that entice the user to keep the particular service or source indicated by the score as one to which the user will likely terminate access. The content data may include metadata files pertaining to the content or content segments (e.g., characteristics of content portions, content segments related to a current portion of content based on a characteristic). The content data may also include user profiles used to determine likelihoods of the user navigating away from or to a content portion or segment. For example, content data may include information characterizing content such as the director, producer, actors, activities occurring during the content, locations the content was created, any description of the content context or the content production, or any suitable combination thereof.

Applications may be, for example, stand-alone applications implemented on devices. For example, the application may be implemented as software or a set of executable instructions which may be stored in storage 508 and executed by control circuitry 504 of each one of device 500 and user equipment system 501. In some embodiments, applications may be client-server applications where only a client application resides on the device, and server application resides on a remote server. For example, applications may be implemented partially as a client application on control circuitry 504 of each one of device 500 and user equipment system 501 and partially on a remote server as a server application (e.g., content data source 618) running on control circuitry of the remote server. When executed by control circuitry of the remote server (such as content data source 618), the application may instruct the control circuitry to generate the content displays and transmit the generated displays to the devices. The server application may instruct the control circuitry of the content data source 618 to transmit data for storage on the device. The client application may instruct control circuitry of the receiving user equipment to generate the content displays.

Content and/or content data delivered to devices 602, 604, and 606 may be OTT content. OTT content delivery allows Internet-enabled user devices, including any device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. YouTube is a trademark owned by Google Inc., Netflix is a trademark owned by Netflix Inc., and Hulu is a trademark owned by Hulu, LLC. OTT content providers may additionally or alternatively provide content data described above.

Content output system 600 is intended to illustrate a number of approaches, or network configurations, by which devices and sources of content and content data may communicate with each other for the purpose of identifying camera angles that capture a content item for which video data is to be provided for. The embodiments described herein may be applied in any one or a subset of these approaches, or in a system employing other approaches for delivering content. The following four approaches provide specific illustrations of the generalized example of FIG. 6.

In one approach, devices may communicate with each other within a home network. Devices may communicate with each other directly via short-range point-to-point communication schemes described above, via indirect paths through a hub or other similar device provided on a home network, or via communications network 614. Each of the multiple individuals in a single home may operate different devices on the home network. As a result, it may be desirable for various content application information or settings to be communicated between the different devices. For example, it may be desirable for users to maintain consistent application settings on different devices within a home network, as described in greater detail in Ellis et al., U.S. Patent Publication No. 2005/0261827, filed Jul. 11, 2005. Different types of devices in a home network may also communicate with each other to transmit content. For example, a user may use content navigation button 120 on one device while the content is transmitted to a second device to be generated for display.

In a second approach, users may have multiple types of user equipment by which they access content. For example, some users may have home networks that are accessed by in-home and mobile devices. Users may control in-home devices via an application implemented on a remote device. For example, users may access an online application on a website via a personal computer at their office, or a mobile device such as a PDA or web-enabled mobile telephone. The user may set various settings (e.g., recordings, reminders, content segment buffering enablement, or other settings) on the online content application to control the user's in-home equipment. The online application may control the user's equipment directly, or by communicating with an application on the user's in-home equipment. Various systems and methods for devices communicating, where the devices are in locations remote from each other, is discussed in, for example, Ellis et al., U.S. Pat. No. 8,046,801, issued Oct. 25, 2011, which is hereby incorporated by reference herein in its entirety.

In a third approach, users of devices inside and outside a home may use their application to communicate directly with content source 616 to access content. Specifically, within a home, users of user television equipment 602 and user computer equipment 604 may access the application to navigate among and locate desirable content. Users may also access the application outside of the home using wireless user communications devices 606 to navigate among and locate desirable content.

In a fourth approach, devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud may include a collection of server computing devices, which may be located centrally or at distributed locations, that provide cloud-based services to various types of users and devices connected via a network such as the Internet via communications network 614. These cloud resources may include one or more content sources 616 and one or more content data sources 618. In addition or in the alternative, the remote computing sites may include other devices, such as user television equipment 602, user computer equipment 604, and wireless user communications device 606. For example, the other devices may provide access to a stored copy of a video or a streamed video. In such embodiments, devices may operate in a peer-to-peer manner without communicating with a central server.

The cloud provides access to services, such as content storage, content sharing, or social networking services, among other examples, as well as access to any content described above, for devices. Services may be provided in the cloud through cloud computing service providers, or through other providers of online services. For example, the cloud-based services may include a content storage service, a content sharing site, a social networking site, or other services via which user-sourced content is distributed for viewing by others on connected devices. These cloud-based services may allow a device to store content to the cloud and to receive content from the cloud rather than storing content locally and accessing locally-stored content.

Cloud resources may be accessed by a device using, for example, a web browser, an application, a desktop application, a mobile application, and/or any combination of access applications of the same. The device may be a cloud client that relies on cloud computing for application delivery, or the device may have some functionality without access to cloud resources. For example, some applications running on the device may be cloud applications, i.e., applications delivered as a service over the Internet, while other applications may be stored and run on the device. In some embodiments, a user device may receive content from multiple cloud resources simultaneously. For example, a user device may stream audio from one cloud resource while downloading content from a second cloud resource. Or a user device may download content from multiple cloud resources for more efficient downloading. In some embodiments, devices may use cloud resources for processing operations such as the processing operations performed by processing circuitry described in relation to FIG. 5.

Any one or more of device 500 and user equipment system 501 of FIG. 5 and user television equipment 602, user computer equipment 604, and wireless user communications device 606 of FIG. 6 may be used to identify camera angles for which to provide video data using at least one of a network parameter or likelihood of interest. For example, the content applications, associated with user devices, of the present disclosure may provide video data for popular camera angles (e.g., using historical data to determine camera angles that have been viewed by a threshold number of users or for a threshold amount of time). Further details of the present disclosure are discussed below in connection with the flowcharts of FIGS. 7-9. It should be noted that the steps of processes 700, 800, and 900 of FIGS. 7-9, respectively, may be performed by control circuitry 504 of FIG. 5. Control circuitry 504 may be part of a device having a display 512 (e.g., a device that may have any or all of the functionality of user television equipment 602, user computer equipment 604, and/or wireless communications device 606 of FIG. 6 such as user device 410 of FIG. 4), part of a remote server separated from the user equipment by way of a communications network (e.g., communications network 614 of FIG. 6), or distributed over a combination of both.

FIG. 7 depicts a flowchart of illustrative process 700 for determining one or more camera angles to provide based on a network parameter, in accordance with at least some embodiments of the disclosure.

At step 702, the content application determines a network parameter for a network over which a content item is provided to a device. For example, the content application determines a network bandwidth, a number of users on the network, a maximum download speed, any suitable performance or usage metric of a network, or any combination thereof.

At step 704, the content application determines whether the network parameter supports transmission of the video data for one or more camera angles over the network. The content application identifies, in some implementations, one or more of the plurality of camera angles for which to provide video data using the network based at least in part on the network parameter. For example, the content application determines to provide video data for 10 camera angles whose sum of download speeds does not exceed the maximum download speed of the network.

Although not depicted in process 700, the content application may further base the identification of camera angles for which video data is to be provided on a predetermined distribution of camera angles within 360 degrees. For example, camera angles are provided in distribution such that there is an approximately even distribution of camera angles between the end points of angles available. A content application may divide the total range of angles available by a number of camera angles to be provided or any suitable number for providing an even distribution of camera angles. If a content item is associated with camera angles from 0 to 90 degrees, an approximately even distribution of 2 camera angles may be at 30 and 60 (e.g., dividing 90 by the number of camera angles plus 1). Similarly, an approximately even distribution of 3 camera angles may be at 23, 46, and 69. In some embodiments, prior to proceeding to step 706, the content application identifies one or more camera angles for which to provide video data further based on a user indication of a camera angle. For example, the content application identifies camera angles based on a change in orientation of the device such as a tilt of the device (e.g., tilting by N degrees to select a camera angle N degrees away) or a shake of the device (e.g., to select the next angle available in a clockwise sequence). In some embodiments, the content application provides a notification to the device, indicating that the network will not adequately support the video data corresponding to the camera angle as requested through a user indication. For example, a user may tilt the phone to an angle that requires a download speed higher than the network can support. In response to determining that the network will not adequately support the video data for that angle, the content application may provide a notification on a user interface of the device alerting the user to the failed attempt to switch angles.

At step 706, the content application causes the video data for the one or more camera angles of step 704 to be provided to a device. For example, the content application communicates one or more video data addresses (e.g., video data addresses 320-329) of respective camera angles to the device. The content application additionally provides, in some implementations, authorization to the device to access the video data addresses. The video data addresses may be hosted by a content source such as content source 430.

FIG. 8 depicts a flowchart of an illustrative process for identifying a camera angle that is likely to be of interest, in accordance with at least some embodiments of the disclosure.

At step 802, the content application makes video data for camera angles available to a device. As described in step 706 of process 700, the content application, in some embodiments, makes video data available by providing video data addresses (e.g., addresses 320-329) hosting the video data of the respective camera angles.

At step 804, the content application determines whether one or more of the camera angles are likely to be of interest. The content application dynamically identifies camera angles that are likely to be of interest by comparing camera angles to one another (i.e., determining some are likely to be of interest relative to others). For example, the content application determines that the camera angle having the largest depiction of a cricket ball (e.g., the depiction of the ball at one camera angle occupies a larger percentage of the video frame dimension than the depictions of the ball at other camera angles) is likely to be of interest relative to other camera angles. The content application determines, in some embodiments, that a view of an event being depicted is unobstructed. For example, the content application uses image processing to identify objects and determines a mapping of what objects should be depicted at which angles. The content application may identify a cricket ball is present in one angle, that the view is unobstructed in that angle, and that the view of the cricket ball is obstructed in another angle because although the ball should be depicted in the other angle, image processing does not recognize any ball in the other angle.

Although not depicted in process 800, the content application may rank the camera angles according to the relative likelihoods of interest among camera angles (e.g., before proceeding to step 804). For example, the content application ranks camera angles with unobstructed views of a ball higher than camera angles with obstructed views. The content application uses, in some embodiments, historical data to rank camera angles. For example, the content application ranks camera angles at any time of the content item's consumption according to the number of devices to which the video data for those camera angles was provided or the number of requests received by devices to consume the video data at the respective camera angles. Based on the determined ranking, the content application may provide visual indicators for display at the device that are indicative of the determined ranking of the camera angles. For example, the content application provides a visual indicator for a top percentile (e.g., the top 10%) of ranked camera angles such that the user sees an icon on the user interface of the device that is brighter than, a different color than, a larger size than, or distinguished in any suitable visual manner from, an icon associated with a camera angle outside of the top percentile.

In some embodiments, camera angles are pre-curated such that the dynamic identification occurs prior to the video data for the camera angles being made available to the device. For example, video data may be stored at a content source and the content application may determine, using any of the dynamic identification methods described herein, which of the camera angles for which video data is stored to be provided over time to a user device (e.g., provide camera angle 45 degrees at the start of the content item and switch to camera angle 120 degrees after 25 seconds).

At step 806, the content application causes the video data for the one or more of the camera angles to be provided to the device. For example, the content application automatically provides, for display, the video data associated with the camera angles that are determined to be the most likely to be of interest relative to other angles. The content application may, to provide the video data for the identified camera angles, authorize the device to access video data addresses associated with the identified camera angles while disabling authorization to access other video data addresses.

Figure 9:
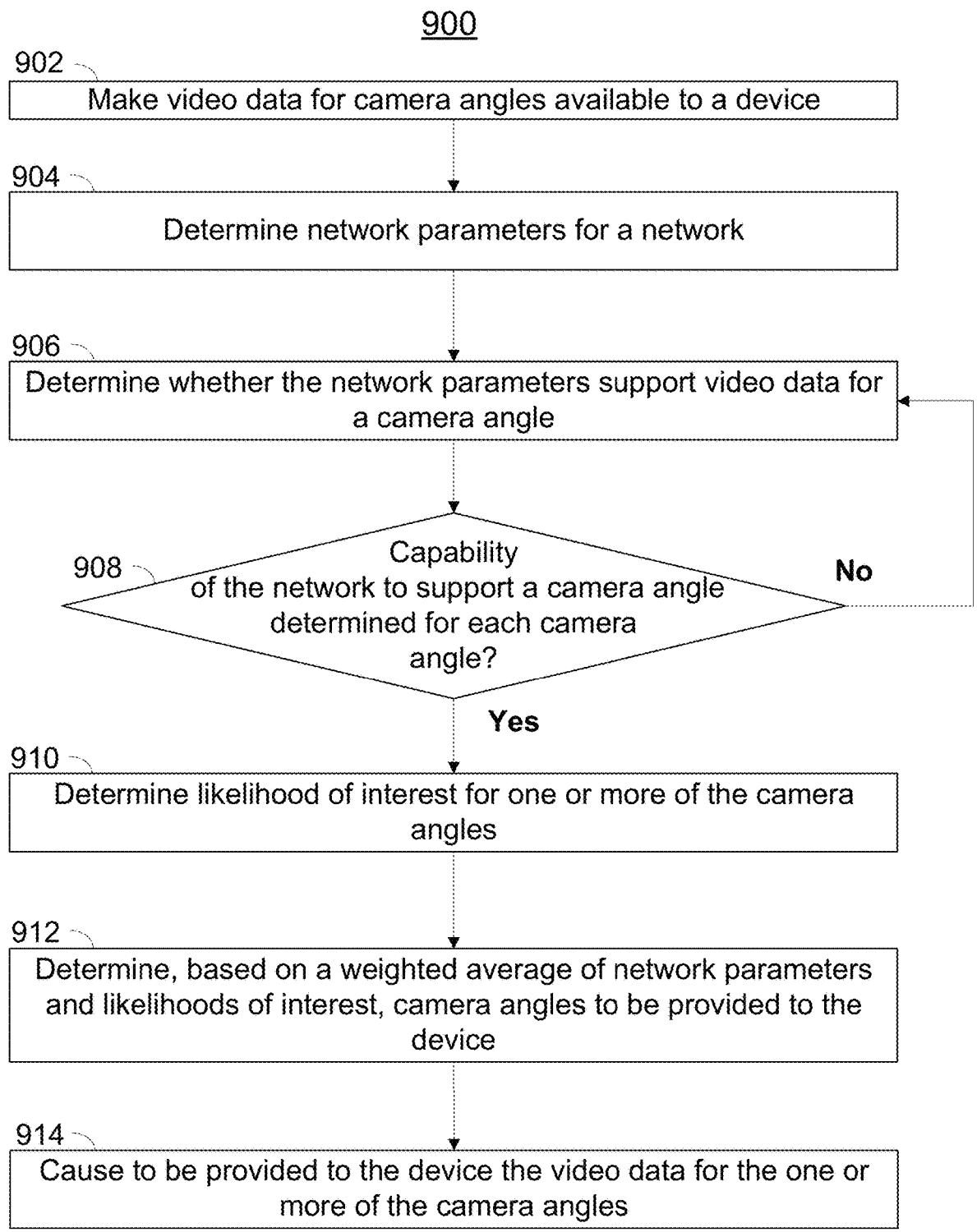
FIG. 9 depicts a flowchart of an illustrative process for determining camera angles to provide based on both a network parameter and a likelihood of interest, in accordance with at least some embodiments of the disclosure.

FIG. 9 depicts a flowchart of illustrative process 900 for determining camera angles to provide, based on both a network parameter and a likelihood of interest, in accordance with at least some embodiments of the disclosure. The steps of processes 700 and 800 may be steps within process 900.

At step 902, the content application makes video data for camera angles available to a device. The content application may provide video data addresses of respective camera angles to a device. Making video data available includes, in some embodiments, allowing the user to request video data of all available camera angles without transmitting the video data to the device. For example, a user interface on a display of the device may show that 50 camera angles are made available by the content application for consumption, but video data is provided only for a subset of the camera angles based on the subsequent steps 904-914.

At step 904, the content application determines network parameters for a network. Network parameters include network bandwidth, number of devices on the network, a maximum download speed, any suitable performance metric of a network, any suitable usage metric of a network, or any combination thereof. For example, the content application determines a network bandwidth of 200 Mbps and that there are 4 devices on the network. From this, the content application may use a hypothetical allocation of 50 Mbps/user of the network bandwidth when determining which camera angles are supported by the network in step 906.

At step 906, the content application determines whether the network parameters support video data for a camera angle. Although multiple network parameters are used in process 900, one or more network parameters may be used to determine capability of the network to support a camera angle (e.g., in step 908) or used for the weighted average in step 912. The content application evaluates, in some embodiments, a camera angle based on a combination of the network bandwidth and the number of devices on the network. For example, a camera angle at 300 degrees (e.g., camera angle corresponding to video data address 320) requires a bit rate of 5 Mbps.

At step 908, the content application determines whether the capability of the network to support a camera angle is determined for each camera angle. If the content application has not determined the capabilities of the network to support all camera angles available from step 902, the content application returns to step 906 to determine whether the network parameters support video data for another camera angle. For example, the content application may return to step 906 to determine that a camera angle at 340 degrees (e.g., camera angle corresponding to video data address 321) requires a bit rate of 45 Mbps due to 4k formatting. Once the content application has determined the capabilities of the network to support each camera angle (e.g., for each angle, whether the network can or cannot support that angle), the content application proceeds to step 910.

At step 910, the content application determines the likelihood of interest for one or more of the camera angles. For example, the content application uses image processing on what is depicted through the camera angle at 300 degrees and through the camera angle at 55 degrees. The content application may identify the objects depicted and the relative sizes of those objects in one camera angle compared to the other. For example, a cricket ball is depicted at both 300 degrees and 55 degrees, but the size of the cricket ball depicted at the 300-degree camera angle is larger than that of the same ball depicted at the 55-degree camera angle. The content application, accordingly, determines that the camera angle at 300 degrees is more likely to be of interest compared to the camera angle at 55 degrees.

Although not depicted, the content application may calculate various permutations of groups of camera angles supported by the network. For example, a combination of camera angles at 300 and 55 degrees and a combination of camera angles at 300, 55, and 145 degrees are both supported by the network.

At step 912, the content application determines, based on a weighted average of network parameters and likelihoods of interest, camera angles to be provided to a device. For example, the content application applies weights to network parameters and interest parameters (e.g., historical data, real-time statistics, relative sizes of objects depicted in camera angles, and unobstructed views). Based on preferences in a user profile, the content application weighs, in some embodiments, unobstructed views higher than real-time statistics of the camera angle that is most accessed. The content application may determine that camera angles at 300 degrees and 55 degrees are to be provided rather than camera angles at 300 degrees and 145 degrees. Although both combinations may be determined to be supported by the network, the camera angle at 55 degrees may have an unobstructed view while the camera angle at 145 degrees does not, and the weight for the parameter for unobstructed views is large (e.g., the user profile indicates that he heavily prioritizes unobstructed views).

At step 914, the content application causes the video data for the one or more of the camera angles to be provided to the device. The content application may authorize the device to access video data addresses associated with the identified camera angles while disabling authorization to access other video data addresses. The display may be an automated switch between camera angles that are determined to be of most interest. For example, although video data for camera angles at both 300 degrees and 55 degrees are provided, the camera angle at 55 degrees may be the more interesting of the two camera angles. In response to determining the camera angle associated with the highest likelihood of interest, the content application, in some embodiments, provides the video data associated with the camera angle at 55 degrees to be displayed automatically on the device.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real-time. It should also be noted, the systems and/or methods described above may be applied to, or used in accordance with, other systems and/or methods.

What is claimed is:

1. A computer-implemented method comprising:
identifying an object in a video content item, wherein the video content item comprises an event and a plurality of camera angles for the event;
determining by processing circuitry, from the plurality of camera angles, a portion of camera angles at which the object may be depicted at a particular time, wherein the object is not depicted in a first camera angle of the portion of camera angles at the particular time;
evaluating, for each camera angle of the portion of camera angles, a bit rate required to stream video data associated with the camera angle, wherein a second camera angle of the portion of camera angles requires a different bit rate than the first camera angle;
calculating using the processing circuitry, an amount of a total available network bandwidth to allocate to each device of a number of devices connected to a network;
selecting a subset of the portion of camera angles based at least in part on:
  (a) the amount of the total available network bandwidth to allocate to each device of the number of devices,
  (b) the required bit rate for each camera angle of the portion of camera angles, and
  (c) the event of the video content item, wherein:
    the sum of the required bit rates for the subset of the portion of camera angles does not exceed the amount of the total available network bandwidth to allocate to each device of a number of devices; and
causing to be provided, to each device of the number of devices, video data for a view from the selected subset of the portion of camera angles.

2. The method of claim 1, further comprising:
determining a maximum download speed; and
determining that the view from the selected subset of the plurality of camera angles is not greater than the maximum download speed.

3. The method of claim 1, wherein;
the portion of the camera angles comprise a predefined distribution of camera angles between 0° and 360°; and
selecting the subset of the portion of camera angles is further based on a distribution of camera angles in the subset being evenly distributed between 0° and 360°.

4. The method of claim 1, wherein selecting the subset of the portion plurality of camera angles is further based on a user indication of a camera angle of the plurality of camera angles.

5. The method of claim 4, wherein the user indication of the camera angle corresponds to a change of an orientation of a device of the number of devices.

6. The method of claim 4, further comprising providing a notification, to a device of the number of devices, indicating that the network will not adequately support the video data corresponding to the camera angle of the plurality of camera angles.

7. The method of claim 1, wherein causing to be provided, to each device of the number of devices, the video data for the subset of the plurality of camera angles comprises communicating, to the number of devices, one or more of a plurality of video data addresses corresponding to the subset of the portion of camera angles.

8. The method of claim 7, further comprising providing an authorization to the number of devices to access the one or more of the plurality of video data addresses.

9. The method of claim 1, wherein selecting a subset of the plurality of camera angles based on calculating the amount of the total available network bandwidth to allocate to each device of the number of devices, comprises dividing the total available network bandwidth by the number of devices connected to the network.

10. The method of claim 1, wherein:
the portion of the camera angles comprises a first distribution of camera angles within a first angular range; and
selecting the subset of the portion of camera angles based on the event of the video content item comprises:
determining a second angular range based on the event; and
selecting camera angles that comprise a second distribution of camera angles within the second angular range.

11. The method of claim 1, wherein selecting the subset of the portion of camera angles is further based on a position of the object in the video content item in relation to each of the portion of camera angles.

12. The method of claim 1, wherein:
evaluating the bit rate required to stream video data associated with the camera angle comprises identifying a format of the camera angle; and
the required bit rate is based at least in part on the format of the camera angle.

13. A system comprising:
processing circuitry remote from a device, the processing circuitry configured to:
identify an object in a video content item, wherein the video content item comprises an event and a plurality of camera angles for the event;
determine, from the plurality of camera angles, a portion of camera angles at which the object may be depicted at a particular time, wherein the object is not depicted in a first camera angle of the portion of camera angles at the particular time;
evaluate, for each camera angle of the portion of camera angles, a bit rate required to stream video data associated with the camera angle, wherein a second camera angle of the portion of camera angles requires a different bit rate than the first camera angle;
calculate an amount of a total available network bandwidth to allocate to each device of a number of devices connected to a network;
select a subset of the portion of camera angles based at least in part on:
(a) the amount of the total available network bandwidth to allocate to each device of the number of devices,
(b) the number of devices connected to the network the required bit rate for each camera angle of the portion of camera angles, and
(c) the event of the video content item, wherein:
the sum of the required bit rates for the subset of the portion of camera angles does not exceed the amount of the total available network bandwidth to allocate to each device of a number of devices; and
output circuitry configured to cause to be provided, to each device of the devices, video data for a view from the selected subset of the portion of camera angles.

14. The system of claim 13, wherein the processing circuitry is further configured to:
determine a maximum download speed; and
determine that the view from the selected subset of the plurality of camera angles is not greater than the maximum download speed.

15. The system of claim 9, wherein;
the portion of the camera angles comprise a predefined distribution of camera angles between 0° and 360°; and
the processing circuitry is configured to select the subset of the portion of camera angles further based on a distribution of camera angles in the subset being evenly distributed within 360 degrees.

16. The system of claim 13, wherein the processing circuitry is configured to select the subset of the portion of camera angles further based on a user indication of a camera angle of the plurality of camera angles.

17. The system of claim 16, wherein the user indication of the camera angle corresponds to a change of an orientation of a device of the number of devices.

18. The system of claim 16, the processing circuitry further configured to provide a notification, to a device of the number of devices indicating that the network will not adequately support the video data corresponding to the camera angle of the plurality of camera angles.

19. The system of claim 13, wherein the output circuitry is configured to cause to be provided, to each device of the number of devices, the video data for the subset of the plurality of camera angles by communicating, to the number of devices, one or more of a plurality of video data addresses corresponding to the subset of the portion of camera angles.

20. The system of claim 19, wherein the output circuitry is further configured to provide an authorization to the number of devices to access the one or more of the plurality of video data addresses.

* * * * *